Dec. 21, 1948. G. F. REED ET AL 2,456,793
SAFETY RETAINING DEVICE FOR PIVOTAL JOINTS
Filed Oct. 20, 1944
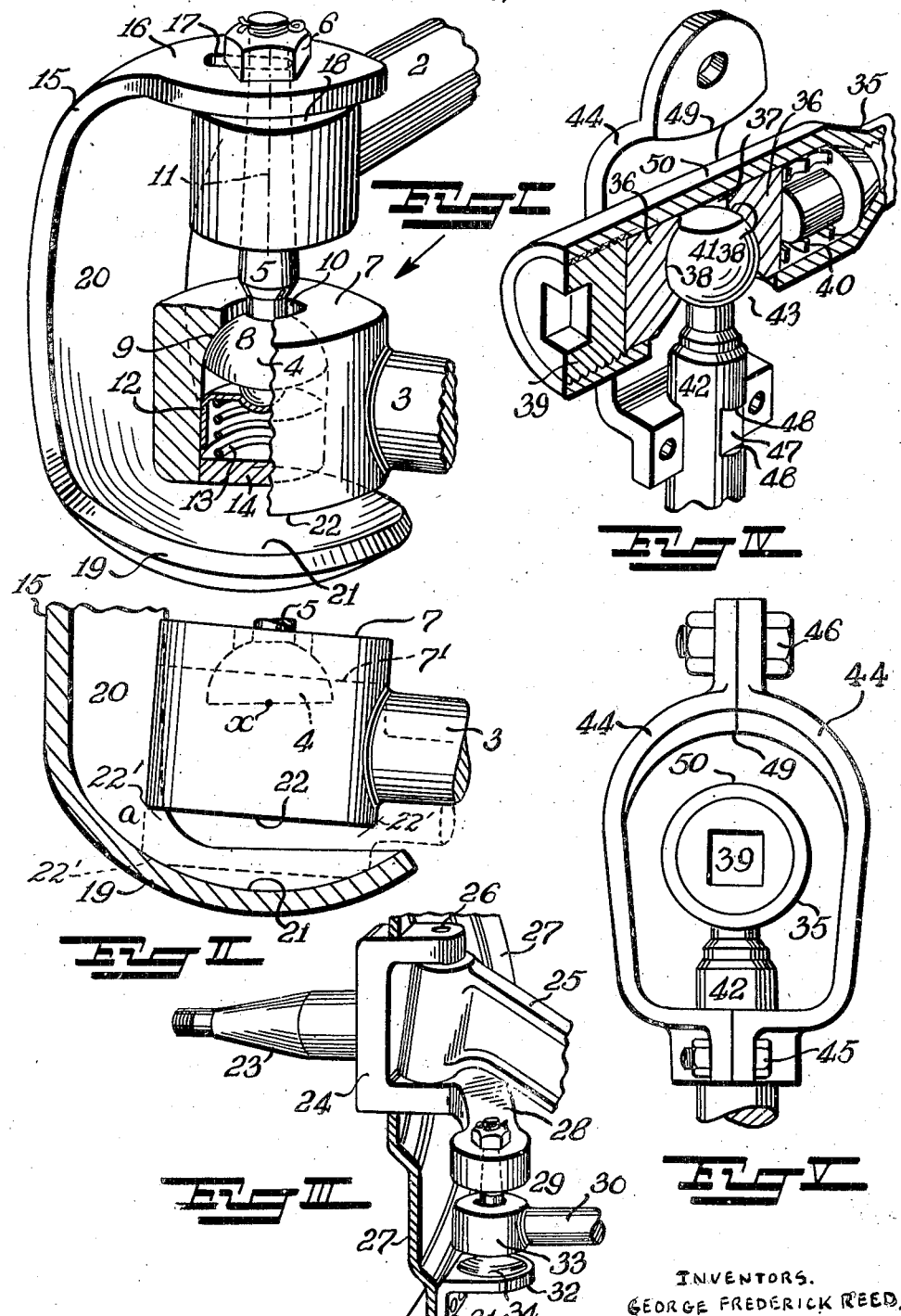
INVENTORS.
GEORGE FREDERICK REED,
WILLIAM HENRY GOULD,
by Haseltine, Lake & Co
ATTORNEYS.

Patented Dec. 21, 1948

2,456,793

UNITED STATES PATENT OFFICE 2,456,793

SAFETY RETAINING DEVICE FOR PIVOTAL JOINTS

George Frederick Reed and William Henry Gould, Johannesburg, Transvaal, Union of South Africa Application October 20, 1944, Serial No. 559,632
In the Union of South Africa December 8, 1943

9 Claims. (Cl. 280—96.1)

This invention relates to pivotal joints. One of the objects of the invention is to ensure that the pivoted members do not part, while avoiding interference with the normal operation of the joint. A further object of the invention is to give a clear warning when danger of the joint members parting is imminent. Accordingly the utility of the invention is best developed in the case of pivotal joints included in a chain of elements whose failure is likely to produce serious consequences. The pivotal joints of car steering apparatus fall in this category.

Said pivotal joints of car steering gears are commonly constructed with co-operating wearing surfaces of general conoidal form providing an axis about which the principal oscillating movement of the joint members occurs in a plane perpendicular to said axis; the joint being also adapted to allow for secondary oscillating movement of less magnitude in directions other than in that plane. The construction provided to permit this secondary movement to some extent impairs the security of the joint; and in particular makes it easier than need otherwise be the case for the pivoted members to separate by relative displacement in the direction of said axis.

For example in the case of the ball and socket joint which is the kind of joint often fitted to allow for the secondary movement, wear between the ball and the socket is apt to permit the ball to escape through the aperture of the socket through which passes the stem or neck by which the ball within the socket is connected to parts external of the socket.

It is with conoidal pivotal joints of this kind, and working in the condition described, that the invention is particularly concerned.

According to the invention, the joint comprises additional means potentially capable of setting a limit to such movement or displacement, said additional means comprising rigid stop surfaces rigidly associated respectively with the respective joint members and so positioned relatively to one another as to be normally out of contact, the stop surfaces having a path of relative movement determined by the specified relative movement or displacement of the jointed members, said path ending in contact between said stop surfaces that limits such specified movement or displacement; the stop surfaces being so separate and distinct from the bearing surfaces as to be substantially unworn by the pivotal action when they make contact with one another.

In the case of a pivotal joint in which the pivotally jointed members are oscillatable about an axis and comprise contacting parts of conoidal form which, upon wear occurring between said contacting parts, permit the relative movement or displacement of the pivotally jointed members along said axis, such conoidal formation is normally active to oppose such axial relative movement or displacement of the pivotally jointed members and the additional means is also disposed to limit movement or displacement in such axial direction.

Also according to the invention, when the two pivotal members are in pivotal contact at internal and external conoidal bearing surfaces and thus capable of permitting movement or displacement in the direction of the axis of the conoidal formation, and towards the smaller end thereof upon wear of the surfaces, the additional means comprises a part rigid with one of said members and a formation rigid with the other member, said part being spaced behind and clear of said formation and so as to make stopping contact with said formation as the consequence of the relative movement or displacement of the members attaining a magnitude determined by the spacing of said part from said formation.

As suggested above, the kind of joint with which the invention is of particular utility comprises a socket having an aperture, a ball within the socket and mounted on a stem extending through said aperture, the ball tending to part from the socket by movement or displacement towards the aperture. A safety device suitable for such a ball and socket joint comprises a rigid structure having means for clamping it to one of the members of the joint and including a part adapted to be spaced behind the other member of the joint in the direction of movement or displacement of the ball towards the aperture of the socket, by a distance commensurate with a safe degree of such movement or displacement, the device being otherwise shaped to stand clear of the other member during normal operation of the joint.

The invention further comprises specific forms of such a safety retaining device, as described hereafter.

Examples of the invention are shown in the accompanying drawings in which

Figure I is a perspective view showing a ball joint between a tie rod and a steering arm with one form of retaining device.

Figure II is another view of the lower part of Figure I.

Figure III is a perspective view showing the same kind of joint with a different retaining device.

Figure IV is a sectioned perspective view of a ball joint between a steering arm and a drag link.

Figure V is an end view of Figure IV.

Figure I shows a usual ball joint between the steering arm 2 of a stub axle assembly and a tie rod 3. At the end of the steering arm 2 the functionally effective portion 4 of a ball is mounted by means of the ball stem 5, secured in said arm 2 by the nut 6 and extending at right angles to said arm. The ball 4 is enclosed in the socket 7 provided at the end of the tie rod 3. The spherical surface 8 of the ball contacts with the zone 9 of the socket spherical surface surrounding the socket aperture 10 through which the stem 5 extends; so that such spherical surface 9 constitutes the normal means of retaining the ball in the socket. Since the surfaces 8 and 9 are conoidal about the axis 11, they can be kept free of play resulting from wear between them, by being pressed together in the direction of said axis; and this is done by the cup 12 and spring 13. A cap 14 retains the spring 13 in compression and also closes in the socket to retain lubricant therein.

In the joint described, such play between the ball and the socket is to a large extent suppressed by the spring 13; the principal effect of wear of the spherical surfaces 8 and 9 being a gradual displacement of the ball and the socket from their relative positions shown, which is that before wear begins. This displacement is along the axis 11 and such that the ball 4 approaches the aperture 10; and if allowed to continue it would result in the ball passing through the aperture. However the joint remains in good usable condition within a limited range of such displacement, for example within the limit represented by the dotted line position of the socket in Figure II. The arm 2 oscillates in a materially horizontal plane while force transmitted between the ball and the socket is exerted in another plane spaced from that first mentioned, tending additionally to drag the ball out of the socket.

The means provided by the invention has no effect on the normal pivotal movement of the joint members relatively to one another, but is concerned only with the aforesaid movement or displacement of the ball towards the aperture 10 and has the effect of stopping said movement or displacement when it has grown to such an extent that the possibility of the ball leaving the socket is imminent.

The means shown for this purpose in Figures I and II consists of the U-shaped member 15. One arm 16 of the U is formed with a slot 17 by means of which it is passed over the screwed end of stem 5 and seated on the surface 18 of the steering arm 2; where it is rigidly secured by tightening down the nut 6.

The other arm 19 of the U faces the part 16 and is materially parallel therewith. The yoke 20 of the U stands well clear of the rod 3 and socket 7, so that it neither impedes the movements of said rod and socket relatively to the arm 2 and ball 4, nor does any wear occur between the U member 15 and said rod and socket while the joint remains in good condition.

Similarly the part 19 makes no contact with or otherwise has any effect on the socket 7 or rod 3; but it is spaced at a determined distance $a$ below the socket. This distance is equal to the distance which the socket and the ball can shift relatively to one another in the parting direction as the result of wear, without imminent danger of the ball leaving the socket.

This wear, being taken up by the spring 13 so that the spherical surfaces 8, 9 are maintained in contact notwithstanding the wear, causes equivalent gradual approach of the lower end of the socket 7 and the inward surface 21 of the part 19. Said surface 21 is made concavely spherical, about a centre that is substantially the centre $x$ of the ball. The circular lower edge 22 of the socket is itself at least approximately a portion of a spherical surface about the same centre as represented by the dash lines 22' in Figure 2. The effect is that the spacing between said spherical surface 21 and the circular edge 22 is scarcely altered by the tilting of the socket in various directions about the ball which it is the function of the ball and socket joint to permit.

Upon the wear reaching the permissible maximum, the socket reaches the dotted line position 7' shown in Figure II and its edge 22' comes into actual contact with the surface 21; this being the first contact between the socket and any part of the member 15 since the latter was installed. The member 15 now functions as a means of positively retaining the ball in the socket. Since the surface 21 and the rim 22 come to this function without previous wear, they are in good condition to perform their function.

Figure III shows a stub axle 23 rigid with a clevis 24 that is pivoted to the main axle 25 by the king pin 26. Rigid with the clevis are the brake backing plate 27 and the steering arm 28 which is essentially similar to the arm 2 of the Figure I example. The ball joint 29 between said arm 28 and the tie rod 30 is essentially like that of Figure I.

The safety device in this case consists of the bracket 31 bolted to the brake backing plate 27 in such a position that its horizontal arm 32 is under the socket 33 of the ball and socket joint 29. As the joint wears the socket 33 progressively drops; but its descent is stopped in time by its contact with the upper surface 34 of the bracket. Said surface 34 is preferably made concave so that it is like the surface 21 of the Figure I example and produces the same advantageous effect.

Figures IV and V show an example of the invention applied to the ball and socket joint at the end of a drag link 35. The joint is of conventional construction comprising the two hard metal pads 36 retained in a bore 37, at the end of the drag link 35 and providing the spherical socket surfaces 38, 38. They are enclosed in the bore 37 by the screw cap 39 and kept together by the stiff spring 40. The ball 41 at the end of the stem 42 is enclosed between said pads 36. In this case the automatic take-up for wear tends to retain the ball centrally in the bore 37; but excessive wear permits the ball to pass through the aperture 43.

To avoid this, a stirrup 44 is clamped rigidly to the stem 42 and arched over the drag link 35 at the side of the latter opposite the aperture 43. In order to enable the stirrup 44 to be thus positioned and to be secured to the stem 42, the stirrup is constructed as a halved clamp, the halves of which are forced together and into gripping engagement with the stem 42 by means of bolts 45. The upper ends of the clamp halves are secured to one another by another bolt 46. The object of the stirrup would be defeated if it slipped along the stem 42; and to avoid this, in the illustrated example two flats one of which is shown and marked 47, are formed at opposite sides of the stem 42 to provide each a pair of opposite shoulders 48 between which the clamp formation fits.

Play of the ball 41 in its socket, allowing the ball to approach the aperture 43, correspondingly brings the stirrup surface 49 towards the surface 50 of the drag link that is opposite the gap 43, until those surfaces touch; when the stirrup 44 positively retains the ball against further play or displacement towards the aperture 43.

The stirrup 44 is without any contact with any part of the drag link 35 so long as the joint remains in good condition. Since the surface 49 is rigid with the ball 41, rotation of the link 35 relatively around the ball 41 does not materially alter the distance between the surfaces 49 and 50; and to compensate for any relative up and down swing of the link, the surface 49 is convexly curved in the corresponding direction.

The ball and socket joints described remain substantially noiseless even when considerably worn; although when the car is running, there is constant play of the ball in the socket especially in the case of the joint between the steering arm and the tie rod (Figure I). This play is reproduced between the safety device and the socket, so that when said parts approach closely enough to one another there is set up between them a series of rapidly repeated impacts that make themselves manifest as noise, giving an insistent warning that the joint requires attention. The fact that the impacts are delivered on the members 15 and 44 at a distance from their points of support causes such members to be distinctly sonorous. Moreover the impacts are such as to be readily felt by the person holding the steering wheel.

Nevertheless the retaining devices, by positively retaining the ball in the socket, enable the car to be driven for some distance after the noise has begun, in order to reach a destination at which a proper repair may be effected.

The devices of the invention also enable a person in charge of a car to keep himself informed of the state of the ball joints, by inspection or measurement of the gap between the potential contact points such as the points 22 and 21. The gap may for instance be measured from time to time by such means as a gauge, and while the car is stationary, thus revealing the gradual displacement of the ball towards the socket aperture.

We claim:

1. A pivotal joint comprising pivotally jointed members having pivotal bearing surfaces wear of which permits relative movement or displacement of the pivotally jointed members from an original relative position, otherwise than in the pivotal direction and tending to cause separation of said members, which surfaces are active to oppose such relative movement or displacement, and means potentially capable of setting a limit to such movement or displacement, said limit being positive and predetermined and less than that which would allow said members to part, said means comprising rigid stop surfaces rigidly associated respectively with the respective jointed members and so positioned relatively to one another as to be normally out of contact, the stop surfaces having a path of relative movement determined by the specified relative movement or displacement of the jointed members, said path ending in contact between said stop surfaces that limits such specified movement or displacement; the stop surfaces being separate and distinct from the bearing surfaces and out of contact therewith at all times so as to be substantially unworn by the pivotal action when the said stop surfaces first make contact with one another.

2. The joint claimed in claim 1 in which the pivotal members are relatively oscillatable about an axis and their contacting bearing surfaces are of conoidal form which, upon wear occurring between them, are adapted to acquire a relative movement or displacement along said axis.

3. The joint claimed in claim 1 in which the two members are in pivotal contact at internal and external conoidal bearing surfaces and thus capable of permitting movement or displacement in the direction of the axis of the conoidal formation and towards the smaller end thereof upon wear of said surfaces, and in which said means comprises a part rigid with one of said members and a formation rigid with the other member, said part being spaced behind and clear of said formation so as to make rigid stopping contact with said formation as the consequence of said axial movement or displacement attaining a magnitude materially equal to the original spacing of said part from said formation.

4. A ball joint comprising a first member including a socket having an aperture and a second member including a ball within the socket and mounted on a stem extending through said aperture and connecting the ball to structure connected to the first member by the joint, the ball tending to part from the socket by movement or displacement through the aperture consequent upon wear of the members, normal means around the aperture opposing such movement or displacement of the ball from the socket, and additional means potentially capable of setting a limit to such movement or displacement, said limit being positive and predetermined and less than that which would allow the members to part; the additional means comprising a rigid part rigidly secured to said second member having a portion thereof spaced from said first member so as to make rigid stopping contact with the socket as a consequence of relative axial movement or displacement of said ball and socket attaining a magnitude materially equal to the original spacing of said portion from said first member.

5. A safety retaining device suitable for a ball and socket joint of the kind comprising a socket having an aperture, a ball within the socket and mounted on a stem extending through said aperture, the ball tending to part from the socket by movement or displacement towards the aperture, and normal means around said aperture arranged to oppose such parting movement or displacement of said ball, said device comprising a rigid structure having means for clamping it to one of the members of the joint and including a part spaced behind the other member of the joint and adapted to move in the direction of movement or displacement of the ball towards the aperture of the socket, by a distance commensurate with a safe degree of such movement or displacement, said part contacting the socket thereafter to prevent further relative movement or displacement of said ball and socket, the part being otherwise shaped to stand clear of the other member during normal operation of the joint.

6. The safety retaining device claimed in claim 5 suitable for a ball and socket joint comprising a steering arm and a screw-threaded stem of the ball passing through said steering arm, in which the device has a U form, one arm of the U being adapted to engage with the steering arm and being perforated to pass over a screwed end of the ball stem mounted on said arm, the second arm of the U being substantially parallel with the first mentioned arm of the U and adapted to stand a short distance behind the socket of the joint.

7. The safety device claimed in claim 5, in which the device is of stirrup form and constructed to clamp onto a ball stem and provides a part adapted to surround a drag link providing the socket, and standing clear of the drag link at the opposite side of said drag link from the aperture of the socket.

8. The combination of a brake backing plate and a steering arm rigid with said plate and fitted with a ball and socket joint, and a bracket on the backing plate positioned beneath the socket of the ball joint and spaced therefrom by a distance commensurate with preventing the members of the joint from parting.

9. The apparatus as claimed in claim 4 in which the first member and the portion present cooperative convex and concave spherical surfaces approximately concentric with the ball in the mean position of the latter.

GEORGE FREDERICK REED.
WILLIAM HENRY GOULD.

REFERENCES CITED

The following references are of record in the file of this patent:

UNITED STATES PATENTS

| Number | Name | Date |
| --- | --- | --- |
| 842,474 | Lightbody | Jan. 29, 1907 |
| 885,878 | Skirrow | Apr. 28, 1908 |
| 1,642,063 | Dodge | Sept. 13, 1927 |
| 1,776,410 | Bendix | Sept. 23, 1930 |
| 1,833,932 | Cadnum | Dec. 1, 1931 |
| 1,854,925 | Crawford | Apr. 19, 1932 |
| 1,866,512 | Todd | July 5, 1932 |
| 1,866,520 | Todd | July 5, 1932 |
| 1,921,141 | Thompson | Aug. 8, 1933 |
| 2,208,325 | Krutsch | July 16, 1940 |

FOREIGN PATENTS

| Number | Country | Date |
| --- | --- | --- |
| 505,307 | Great Britain | May 9, 1939 |